United States Patent [19]

Kojimoto et al.

[11] Patent Number: 4,802,305

[45] Date of Patent: Feb. 7, 1989

[54] COATED SEEDS

[75] Inventors: Susumu Kojimoto; Fumio Nii; Toshio Mori, all of Osaka, Japan

[73] Assignee: Sumitiomo Chemical Company, Limited, Osaka, Japan

[21] Appl. No.: 867,595

[22] Filed: May 27, 1986

Related U.S. Application Data

[63] Continuation of Ser. No. 624,069, Jun. 25, 1984, abandoned.

[30] Foreign Application Priority Data

Jun. 30, 1983 [JP] Japan ................................ 58-119814

[51] Int. Cl.$^4$ ................................................ A01C 1/06
[52] U.S. Cl. .................................. 47/57.6; 47/DIG. 9
[58] Field of Search ............ 47/57.6, DIG. 9, DIG. 7

[56] References Cited

U.S. PATENT DOCUMENTS

| 2,967,376 | 1/1961 | Scott ................................. | 47/57.6 |
| 3,621,612 | 11/1971 | Porter ................................. | 47/57.6 |
| 3,808,740 | 5/1974 | Porter ................................. | 47/57.6 |
| 3,936,976 | 2/1976 | Porter ................................. | 47/57.6 |
| 4,068,602 | 1/1978 | Mickus ................................. | 47/57.6 |
| 4,251,952 | 2/1981 | Porter et al. ........................ | 47/57.6 |
| 4,396,413 | 8/1983 | Miller et al. ........................ | 47/57.6 |

FOREIGN PATENT DOCUMENTS

| 83717802 | 7/1983 | Fed. Rep. of Germany ....... | 47/57.6 |
| 13-3469 | 4/1938 | Japan . | |
| 58-774536 | 8/1983 | Japan .................................. | 47/57.6 |
| 405675 | 2/1934 | United Kingdom ................ | 47/57.6 |

Primary Examiner—Richard J. Johnson
Attorney, Agent, or Firm—Sughrue, Mion, Zinn, Macpeak, and Seas

[57] ABSTRACT

Multi-coated seeds having two or more coating layers, with the innermost coating layer containing a water repellent such as a fatty acid or a metal salt thereof in higher concentration than the other layer(s).

7 Claims, No Drawings

COATED SEEDS

This is a continuation of application Ser. No. 624,069, filed June 25, 1984, abandoned.

FIELD OF THE INVENTION

The present invention relates to multi-coated seeds in which the internal coating layer contains a water repellent.

BACKGROUND OF THE INVENTION

Precise sowing, either mechanically or by hand, has recently come into general use in order to save labor and stabilize growth in vegetable culture. Further, transplanting culture using a seedling tray, pot, etc. has become popular, too. With respect to the sowing into a seedling tray, it is said that accurate and precise sowing by machines or instruments is a necessary condition for the growing of good seedlings. However, precise sowing is very difficult to achieve mechanically in the case of odd-shaped seeds of lettuce, carrot, and Welsh onion, and in the case of small-grained seeds of cabbage and Chinese cabbage. Hand sowing of these seeds is inefficient, requiring much labor.

In order to overcome these disadvantages, it has become a common practice to coat seeds with a proper material to produce spherical grains larger than the seeds. The coating material for this purpose is a mixture of an inorganic matter such as diatomaceous earth, talc, clay, and calcium carbonate, and a binder such as starch, gelatin, and PVA (polyvinyl alcohol). Coated seeds thus produced have a problem. That is, when they are sown in a field where the groundwater level is high or the soil contains excess water due to rainfall after sowing, or in a soil having a high water content due to excessive flooding, the surroundings of the seeds are sealed with water, whereby supply of oxygen to the seeds becomes insufficient to cause poor germination. In order to overcome this disadvantage there was proposed the coating of seeds with a coating material containing a water repellent or waterproofing agent, as disclosed in Japanese Patent Application (OPI) No. 85908/1979 and Japanese Patent Publication No. 3469/1963. (The term "OPI" herein used means an unexamined published Japanese patent application.)

With respect to these proposed methods, the present inventors carried out various testings. As the result, they found that even in these methods, if the soil in which the coated seeds are sown has a high water content due to a large quantity of rainfall or excessive flooding, poor germination still occurs, leading to insufficient results Oxygen and water are indispensable for the germination of seeds. But after the sowing, if the soil has a high water content due to a large quantity of rainfall or excessive flooding, the surroundings of the seeds are sealed with water, whereby supply of oxygen to the seeds becomes insufficient to likely cause poor germination. This can be overcome by controlling the quantity of water surrounding the seeds, whereby stable germination can be achieved. One way of achieving this is to coat seeds with a coating material having mixed with and dispersed therein a water repellent or waterproofing agent, as described above. That is, in this method the water repellent or waterproofing agent in an amount of several percents to 10% is uniformly mixed with and dispersed in the coating material. However, since in this method, the amount of the water repellent or waterproofing agent in the coating later is low or the concentration of the water repellent in the coating layer is uniform, when there is a large quantity of rainfall or excessive flooding, it becomes impossible to control the water content surrounding the seeds, leading to the same situation where the surroundings of the seeds are sealed with water to cause insufficient supply of oxygen to the seeds. Thus, the seeds become dead or damaged to cause poor germination. In other words, according to this method, when there is a large quantity of rainfall or excessive flooding, excessive water surrounding the seeds which is not absorbed by soil infiltrates into the interface between the seed and the coating layer through the cracks on the coating layer to isolate the seed from oxygen.

As the result of extensive studies, the present inventors found that these problems can be solved by the multi-coated seeds in which at least the innermost coating layer contains a water repellent in higher concentration than other coating layer(s). The present invention was completed based on this finding.

SUMMARY OF THE INVENTION

It is an object of this invention to provide multi-coated seeds which germinate satisfactorily without being damaged even when the water content of soil varies over a broad range.

It is another object of this invention to provide multi-coated seeds in which at least the innermost coating layer contains a water repellent in higher concentration than other coating layer(s), so that the seed is prevented from being sealed with water infiltrating through the cracks on the layer, even in the case of a large quantity of rainfall or excessive flooding.

DETAILED DESCRIPTION OF THE INVENTION

The coating layers of the coated seeds of this invention are formed such that the innermost coating layer contains a water repellent in higher concentration than other coating layer(s). The concentration of water repellent in the innermost coating layer should preferably be 15 wt. % or higher to ensure the effect. The thickness of the innermost coating layer may be less than 0.2 mm where the concentration of water repellent is higher than 95 wt. %; but it should be 0.2 mm or more where the concentration of water repellent is low. The other coating layer(s) than the innermost layer may or may not contain a water repellent. The effect of this invention can be produced so long as the innermost coating layer contains a water repellent in higher concentration than other coating layer(s). In the case where the concentration of water repellent in the outer coating layer is low as 5 wt. % or less, the concentration of water repellent in the innermost coating layer should preferably be higher than that by 10 wt. % or more. In other words, the preferred concentration of water repellent in the innermost coating layer is 15 to 95 wt. %.

In the case where the water content of soil is high due to a large quantity of rainfall or excessive flooding, the higher the concentration of water repellent in the coating layers, the better the effect However, the high concentration of water repellent adversely affects the coating operation and increases the production cost. In addition, the water repellent in high concentration softens the coating layers and causes the coating layers to be broken during transportation and sowing. In the case of rather dry soil, there is possibility of the excess water repellent inhibiting germination.

The water repellent which can be used in this invention includes, for example, wax, asphalt, fatty acids and metal salts thereof, mineral oil, and rosin. Among them, fatty acids and metal salts thereof such as stearic acid, calcium stearate, and barium stearate are preferred from the standpoint of adhesion to the seed surface, workability, and effect.

The coating layers can be made from diatomaceous earth, talc, clay, calcium carbonate, and any other inorganic materials which are capable of coating. They can be used alone or in admixture of two or more.

The coating material can be incorporated with a suitable amount of a pesticide such as a fungicide to prevent disease after germination and/or a germination promoter.

The coating of seeds can be accomplished by any known method using a fluid bed granulater (Air-suspension coating apparatus or rotary pan. The multi-layers can be formed by switching the coating material in the course of coating.

The invention is described in more detail with reference to the following examples and comparative examples, which are not intended to limit the scope of this invention.

EXAMPLE 1

Multi-coating on onion seeds was accomplished as follows: One liter of onion seeds having a germination percentage of 85% was coated in a rotary pan with clay uniformly mixed with 30 wt. % of barium stearate, until the coating thickness reached 0.5 mm, while spraying a 0.5% PVA aqueous solution. The coated seeds were further coated with clay.

The coated seeds were 4.5 to 5.5 mm in diameter. After drying at 35° C. for 24 hours, the coated seeds were sown in four plots of field. Flooding was performed every other day so that the water content of soil was kept at 45%, 60%, 70%, and 100% of the maximum water capacity. The germination percentage was measured. The results are shown in Table 1.

EXAMPLE 2

Multi-coating on onion seeds was accomplished as follows: One liter of the same onion seeds as used in Example 1 was coated in a rotary pan with clay uniformly mixed with 15 wt. % of stearic acid powder, until the coating thickness reached 0.7 mm, while spraying a 0.5% PVA aqueous solution. The coated seeds were further coated with clay uniformly mixed with 5 wt. % of stearic acid powder. Sowing and flooding were performed and the germination percentage was measured in the same way as in Example 1. The results are shown in Table 1.

COMPARATIVE EXAMPLE 1

Coating on onion seeds was accomplished as follows: One liter of the same onion seeds as used in Example 1 was coated with clay in the same way as in Example 1. Sowing and flooding were performed and the germination percentage was measured in the same way as in Example 1. The results are shown in Table 1.

COMPARATIVE EXAMPLE 2

Coating on onion seeds was accomplished as follows: One liter of the same onion seeds as used in Example 1 was coated with a mixture composed of 95 wt. % clay and 5 wt. % stearic acid in the same way as in Example 1. Sowing and flooding were performed and the germination percentage was measured in the same way as in Example 1. The results are shown in Table 1.

COMPARATIVE EXAMPLE 3

Coating on onion seeds was accomplished as follows: One liter of the same onion seeds as used in Example 1 was coated with clay uniformly mixed with 30 wt. % of barium stearate in the same way as in Example 1. Sowing and flooding were performed and the germination percentage was measured in the same way as in Example 1. The results are shown in Table 1.

TABLE 1

| | Coating Materials | | Germination Percentage (%) | | | |
| | | | 45% Plot | 60% Plot | 70% Plot | 100% Plot |
| | Internal Coating Layer | External Coating Layer | | | | |
| --- | --- | --- | --- | --- | --- | --- |
| Example 1 | Clay/barium stearate (70/30) | Clay | 84 | 85 | 85 | 85 |
| Example 2 | Clay/stearic acid (85/15) | Clay/stearic acid (95/5) | 85 | 85 | 85 | 84 |
| Comparative Example 1 | Clay | | 80 | 85 | 80 | 5 |
| Comparative Example 2 | Clay/stearing acid (95/5) | | 80 | 85 | 85 | 25 |
| Comparative Example 3 | Clay/barium stearate (70/30) | | 50 | 81 | 84 | 85 |

Note;
Germination percentage was measured 12 days after the sowing. (Number of germinated seeds/Number of sown seeds) × 100%
The water content of soil is expressed in terms of the ratio of held water to maximum water capacity.

As is clear from Table 1, in Examples 1 and 2, the germination percentage measured 12 days after the sowing was 84 to 85%, which value is equal to or very close to the original germination percentage in all the plots of from 45% to 100% in terms of the water content of soil. On the contrary, when the 45% plot is concerned, while Comparative Examples 1 and 2 showed a germination percentage of 80%, which value is close to the original germination percentage, Comparative Example 3 showed a germination percentage of only 50%.

Further, when the 70% plot is concerned, Examples 1 and 2 and Comparative Examples 2 and 3 showed germination percentages equal to or very close to the original germination percentage 85%, and Comparative Example 1 showed a germination percentage close to the original one On the contrary, when the 100% plot is concerned, while Examples 1 and 2 and Comparative Example 3 showed germination percentages equal to or very close to the original one, Comparative Examples 1 and 2 showed greatly decreased germination percentages and in particular, in Comparative Example 1 the germination percentage significantly decreased.

Still further, in Comparative Example 3 nearly 20% of the coated seeds were broken during the sowing because of their weak coating layer. These results indicate that merely increasing the content of water repellent in the coating layer not only decreases the germination percentage of the seeds sown in the soil with low water content, but also lowers the strength of the coating layer.

While the invention has been described in detail and with reference to specific embodiment thereof, it will be apparent to one skilled in the art that various changes and modifications can be made therein without departing from the spirit and scope thereof.

What is claimed is:

1. Multi-coated seeds having two or more coating layers, wherein at least the innermost coating layer contains a water repellent selected from the group consisting of fatty acids and metal salts thereof, said water repellent being present in said innermost coating layer in high concentration than in the other coating layer or layers.

2. Multi-coated seeds as claimed in claim 1, wherein the innermost coating layer contains 15 to 95 wt. % of the water repellent.

3. Multi-coated seeds as claimed in claim 1, wherein said water repellent concentration in said innermost layer is 15 to 95 weight percent.

4. Multi-coated seeds as claimed in claim 1, wherein the water repellent is barium stearate, calcium stearate or stearic acid.

5. In a method for applying, in sowing by machines or instruments, odd-shaped or small-grained seeds, the improvement wherein the seeds used are the seeds of claim 1.

6. A method as claimed in claim 5, wherein said odd-shaped seeds are seeds of lettuce, carrot, Welsh onion or onion.

7. A method as claimed in claim 5, wherein said small-grained seeds are seeds of cabbage or Chinese cabbage.

* * * * *